United States Patent
Kowase

(10) Patent No.: US 10,153,091 B2
(45) Date of Patent: Dec. 11, 2018

(54) MULTI-LAYER CERAMIC CAPACITOR AND METHOD OF PRODUCING THE SAME

(71) Applicant: Taiyo Yuden Co., Ltd., Tokyo (JP)

(72) Inventor: Yusuke Kowase, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 15/845,666

(22) Filed: Dec. 18, 2017

(65) Prior Publication Data

US 2018/0182555 A1    Jun. 28, 2018

(30) Foreign Application Priority Data

Dec. 26, 2016  (JP) ................................. 2016-250858

(51) Int. Cl.
*H01G 4/30*     (2006.01)
*H01G 4/12*     (2006.01)

(52) U.S. Cl.
CPC ............. *H01G 4/30* (2013.01); *H01G 4/1227* (2013.01)

(58) Field of Classification Search
CPC ....................................................... H01G 4/30
USPC ....................................................... 361/301.4
See application file for complete search history.

(56) References Cited

U.S. PATENT DOCUMENTS

| 2011/0141660 | A1* | 6/2011 | Jeong | H01G 4/12 361/321.4 |
| 2014/0301015 | A1 | 10/2014 | Kim | |
| 2015/0348712 | A1* | 12/2015 | Lee | H01G 4/30 174/260 |
| 2016/0196918 | A1* | 7/2016 | Hong | H01G 4/0085 174/260 |

FOREIGN PATENT DOCUMENTS

| JP | 2003309039 A | * 10/2003 |
| JP | 2014-204116 A | 10/2014 |

* cited by examiner

*Primary Examiner* — Eric W Thomas
(74) *Attorney, Agent, or Firm* — Saliwanchik, Lloyd & Eisenschenk

(57) ABSTRACT

A multi-layer ceramic capacitor includes a multi-layer unit and a side margin. The multi-layer unit includes ceramic layers laminated in a first direction, internal electrodes disposed between the ceramic layers, and a side surface from which the internal electrodes are exposed, the side surface being oriented in a second direction orthogonal to the first direction. The side margin covers the side surface. The side margin includes a first area having a porosity of 10% or less, a dimension of the first area in the second direction from the side surface being ¼ of a dimension of the side margin in the second direction, and a second area having a porosity of 10% or more and 25% or less and having a porosity higher than the porosity of the first area, the second area covering the first area from the second direction.

2 Claims, 14 Drawing Sheets

MULTI-LAYER CERAMIC CAPACITOR AND METHOD OF PRODUCING THE SAME

CROSS-REFERENCE TO RELATED APPLICATION

This application claims the benefit of Japanese Priority Patent Application No. 2016-250858, filed Dec. 26, 2016, the disclosure of which is herein incorporated by reference in its entirety.

BACKGROUND

The present invention relates to a multi-layer ceramic capacitor and a method of producing the multi-layer ceramic capacitor.

In recent years, multi-layer ceramic capacitors have been widely used as, for example, electronic components mounted to electronic devices such as smartphones and mobile phones. Such multi-layer ceramic capacitors are vulnerable to external impact in many cases.

In this regard, for example, the invention described in Japanese Patent Application Laid-open No. 2014-204116 provides a technique of providing a part including many pores to a side margin that covers a side surface, from which internal electrodes are exposed, of a multi-layer chip. This relieves external impact and increases impact resistance of a multi-layer ceramic capacitor.

SUMMARY

The multi-layer ceramic capacitor is provided with increased impact resistance when the part including many pores is provided to the side margin. However, when a high voltage is applied thereto, the vicinity of the side margin is prone to cause dielectric breakdown. Therefore, voltage resistance of the multi-layer ceramic capacitor is prone to be lowered.

In view of the circumstances as described above, it is desirable to provide a multi-layer ceramic capacitor in which impact resistance and voltage resistance are ensured, and a method of producing the multi-layer ceramic capacitor.

According to an embodiment of the present invention, there is provided a multi-layer ceramic capacitor including a multi-layer unit and a side margin.

The multi-layer unit includes ceramic layers laminated in a first direction, internal electrodes disposed between the ceramic layers, and a side surface from which the internal electrodes are exposed, the side surface being oriented in a second direction orthogonal to the first direction.

The side margin covers the side surface.

The side margin includes a first area having a porosity of 10% or less, a dimension of the first area in the second direction from the side surface being ¼ of a dimension of the side margin in the second direction, and a second area having a porosity of 10% or more and 25% or less and having a porosity higher than the porosity of the first area, the second area covering the first area from the second direction.

In this configuration, the first area that covers the side surface of the multi-layer unit has high compactness. As a result, even when the internal electrodes are condensed and spheroidized by application of a high voltage to the multi-layer ceramic capacitor, the first area hardly causes breakdown. Therefore, voltage resistance of the multi-layer ceramic capacitor is ensured.

Further, in this configuration, the second area including more pores than in the first area is formed to be larger than the first area in the side margin. Therefore, even when the side margin includes the first area having high compactness, the second area provides flexibility, and thus resistance to physical impact is ensured.

Therefore, the present invention can provide a multi-layer ceramic capacitor in which impact resistance and voltage resistance are ensured.

A dimension of the side margin in the second direction may be 25 μm or less.

This can increase an intersectional area of the internal electrodes and increase the capacitance of the multi-layer ceramic capacitor.

According to another embodiment of the present invention, there is provided a method of producing a multi-layer ceramic capacitor, including: producing an unsintered multi-layer chip that includes ceramic layers laminated in a first direction, internal electrodes disposed between the ceramic layers, and a side surface from which the internal electrodes are exposed, the side surface being oriented in a second direction orthogonal to the first direction; and producing an unsintered body that includes a side margin including a first area covering the side surface and a second area covering the first area from the second direction, the side margin mainly containing insulating ceramic particles, the first area having a higher density of the insulating ceramic particles than the second area, a dimension of the first area in the second direction being ¼ of a dimension of the side margin in the second direction.

According to the method described above, the second area having a lower density of the insulating ceramic particles than that of the first area is formed to be larger than the first area in the side margin.

With this configuration, in the unsintered body, the flexibility of the side margin is ensured by the second area. Therefore, at the time of sintering of the unsintered body, stress caused by a difference in shrinkage behavior between the multi-layer chip and the side margin is relieved. Thus, a structural disorder such as cracks is prevented.

The side margin may be formed by forming a film of ceramic slurry mainly containing insulating ceramics and containing a first solvent and a second solvent having a higher boiling point than a boiling point of the first solvent, and drying the film from one surface thereof.

It is possible to provide a multi-layer ceramic capacitor in which impact resistance and voltage resistance are ensured, and a method of producing the multi-layer ceramic capacitor.

These and other objects, features and advantages of the present invention will become more apparent in light of the following detailed description of embodiments thereof, as illustrated in the accompanying drawings.

DETAILED DESCRIPTION OF EMBODIMENTS

Hereinafter, embodiments of the present invention will be described with reference to the drawings.

In the figures, an X axis, a Y axis, and a Z axis orthogonal to one another are shown as appropriate. The X axis, the Y axis, and the Z axis are common in all figures.

1. OVERALL CONFIGURATION OF MULTI-LAYER CERAMIC CAPACITOR 10

Figure 1:
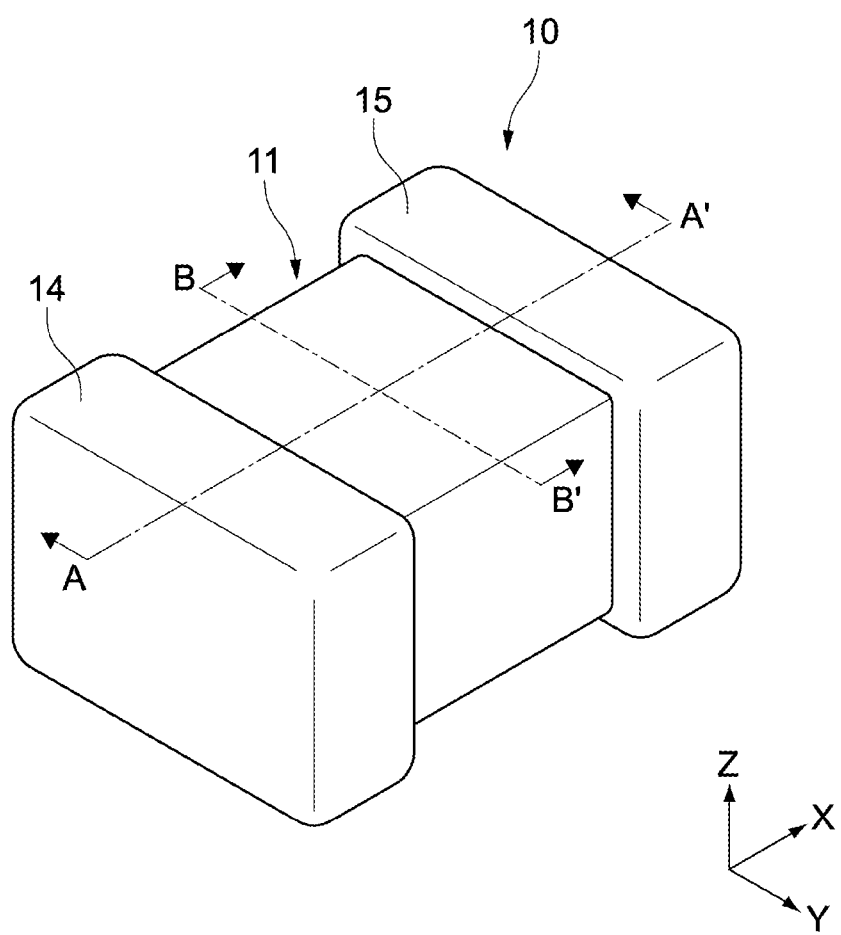
FIG. 1 is a perspective view of a multi-layer ceramic capacitor according to one embodiment of the present invention.
Figure 2:
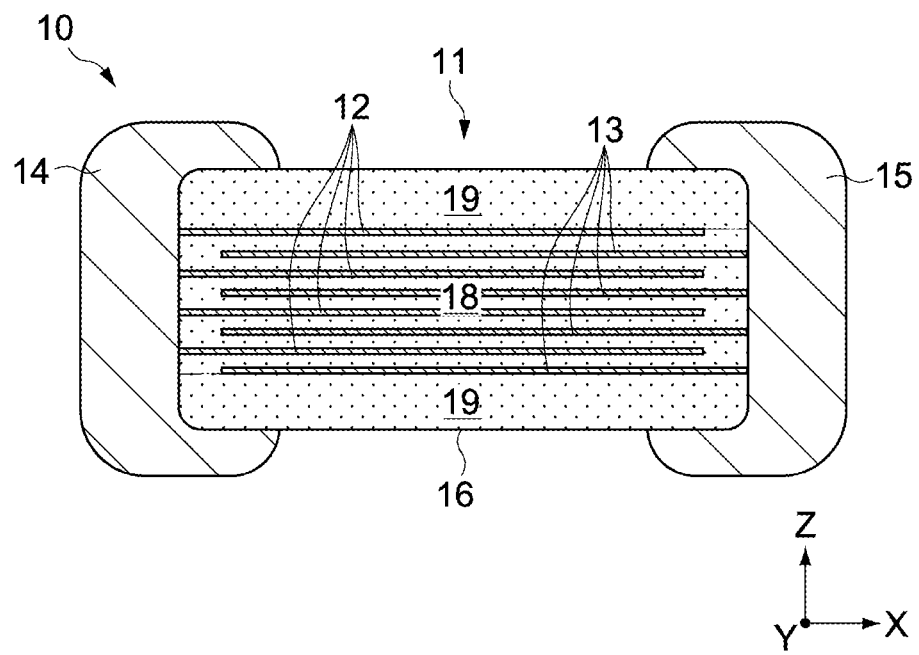
FIG. 2 is a cross-sectional view of the multi-layer ceramic capacitor taken along the A-A' line in FIG. 1.
Figure 3:
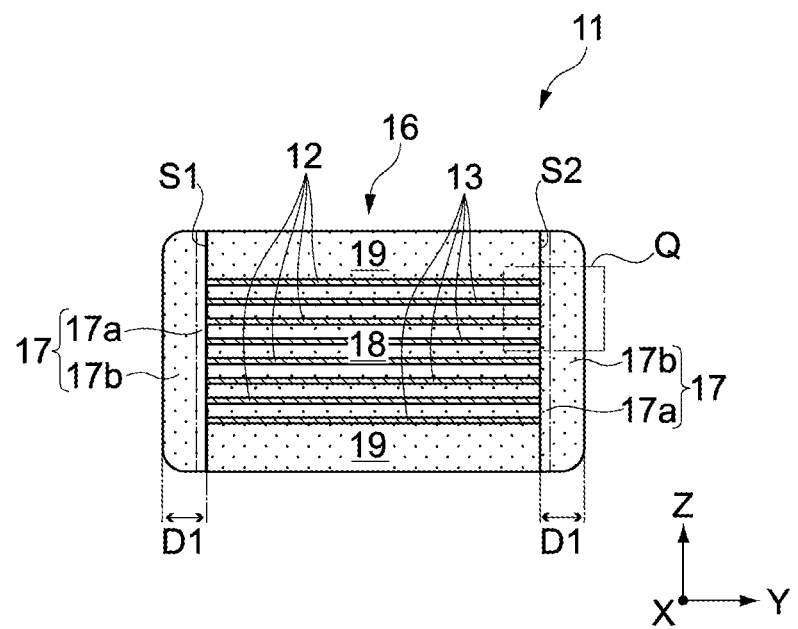
FIG. 3 is a cross-sectional view of the multi-layer ceramic capacitor taken along the B-B' line in FIG. 1.

FIGS. 1 to 3 each show a multi-layer ceramic capacitor 10 according to one embodiment of the present invention. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a body 11, a first external electrode 14, and a second external electrode 15.

Typically, the body 11 has two side surfaces oriented in a Y-axis direction and two main surfaces oriented in a Z-axis direction. Ridges connecting the respective surfaces of the body 11 are chamfered. It should be noted that the form of the body 11 is not limited to the form as described above. For example, the surfaces of the body 11 may be curved surfaces, and the body 11 may be rounded as a whole.

The first external electrode 14 and the second external electrode 15 cover both end surfaces of the body 11 that are oriented in an X-axis direction, and extend to four surfaces that are connected to both the end surfaces oriented in the X-axis direction. With this configuration, both of the first external electrode 14 and the second external electrode 15 have U-shaped cross sections in parallel with an X-Z plane and an X-Y plane.

The body 11 includes a multi-layer unit 16 and side margins 17.

The multi-layer unit 16 has a configuration in which a plurality of flat plate-like ceramic layers extending along the X-Y plane are laminated in the Z-axis direction.

The multi-layer unit 16 includes a capacitance forming unit 18 and covers 19.

The capacitance forming unit 18 includes a plurality of first internal electrodes 12 and a plurality of second internal electrodes 13. The first internal electrodes 12 and the second internal electrodes 13 are alternately disposed between the ceramic layers along the Z-axis direction. The first internal electrodes 12 are connected to the first external electrode 14 and are insulated from the second external electrode 15. The second internal electrodes 13 are connected to the second external electrode 15 and are insulated from the first external electrode 14.

The first internal electrodes 12 and the second internal electrodes 13 are each made of an electrical conductive material and function as internal electrodes of the multi-layer ceramic capacitor 10. Examples of the electrical conductive material include a metal material containing nickel (Ni), copper (Cu), palladium (Pd), platinum (Pt), silver (Ag), gold (Au), or an alloy of them. Typically, a metal material mainly containing nickel (Ni) is employed.

The capacitance forming unit 18 is made of ceramics. In the capacitance forming unit 18, in order to increase capacitances of the ceramic layers provided between the first internal electrodes 12 and the second internal electrodes 13, a material having a high dielectric constant is used as a material forming the ceramic layers. For the capacitance forming unit 18, polycrystal of a barium titanate ($BaTiO_3$) based material, i.e., polycrystal having a Perovskite structure containing barium (Ba) and titanium (Ti) can be used, for example.

Alternatively, the capacitance forming unit 18 may be made of polycrystal of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

The covers 19 are flat plates extending along the X-Y plane and respectively cover the upper and lower surfaces of the capacitance forming unit 18 in the Z-axis direction. The covers 19 are not provided with the first internal electrodes 12 and the second internal electrodes 13.

As shown in FIG. 3, the side margins 17 are formed on both side surfaces S1 and S2 of the capacitance forming unit 18 and the covers 19, the side surfaces S1 and S2 being oriented in the Y-axis direction. A dimension D1 of each side margin 17 in the Y-axis direction is desirably small and desirably set to, for example, 25 µm or less. This can increase an intersectional area of the first and second internal electrodes 12 and 13 and increase the capacitance of the multi-layer ceramic capacitor 10.

Figure 4:
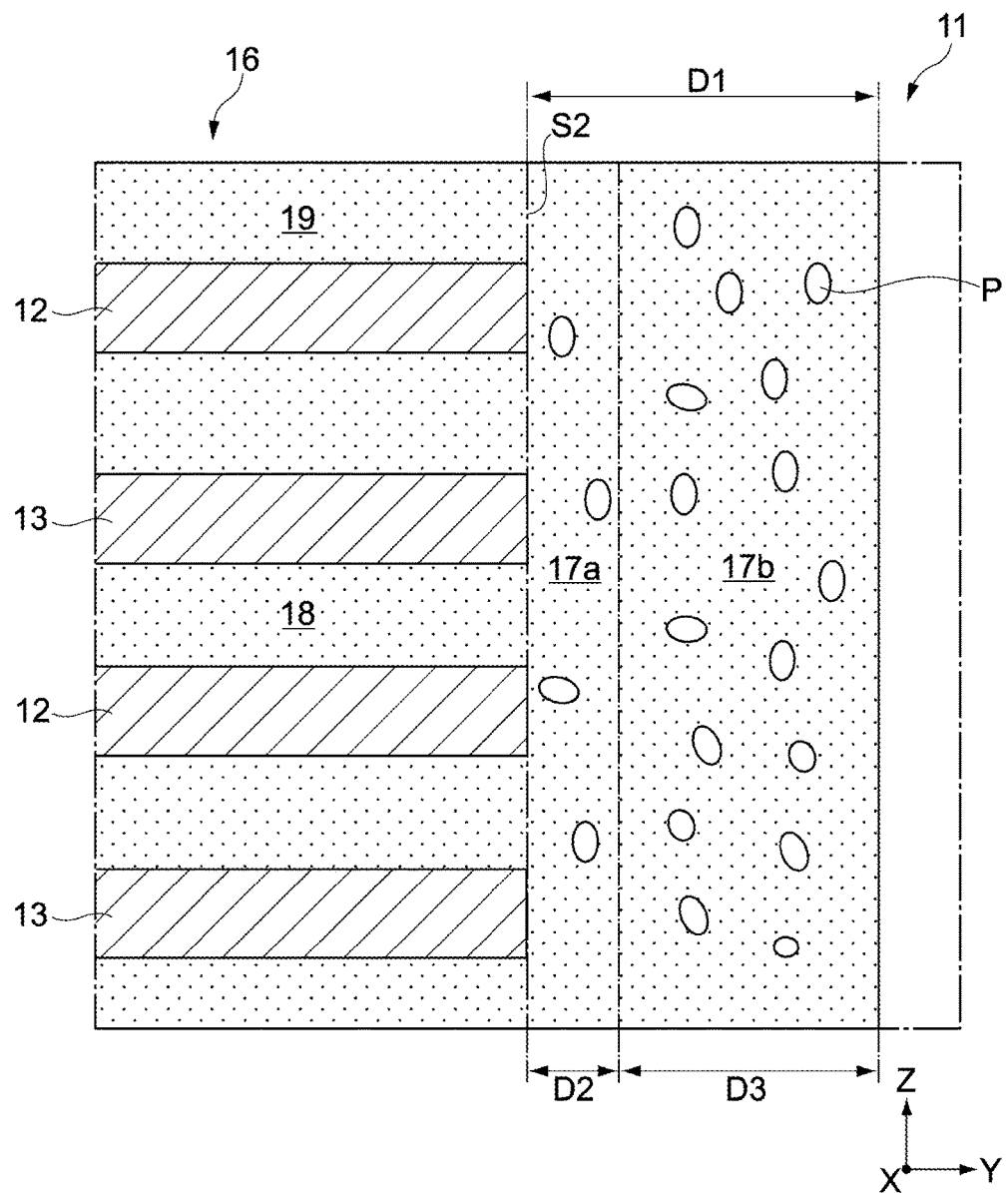
FIG. 4 is an enlarged schematic view of an area Q of the multi-layer ceramic capacitor shown in FIG. 3.

Further, each of the side margins 17 according to this embodiment includes pores P and can be divided into a first area 17a including a relatively small number of pores P and a second area 17b including more pores P than in the first area 17a (see FIG. 4).

Here, as shown in FIG. 3, the first areas 17a cover the side surfaces S1 and S2 of the multi-layer unit 16 from the Y-axis direction, and the second areas 17b cover the first areas 17a from the Y-axis direction. The first areas 17a and the second areas 17b will be described later.

In such a manner, in the body 11, except for both the end surfaces, which are oriented in the X-axis direction and to which the first external electrode 14 and the second external electrode 15 are provided, surfaces of the capacitance forming unit 18 are covered with the side margins 17 and the covers 19. The side margins 17 and the covers 19 have main functions of protecting the periphery of the capacitance forming unit 18 and ensuring insulation properties of the first internal electrodes 12 and the second internal electrodes 13.

The side margins 17 and the covers 19 are also made of ceramics. A material forming the side margins 17 and the covers 19 is insulating ceramics. Use of ceramics having a composition system common to that of the capacitance forming unit 18 leads to suppression of internal stress in the body 11.

The side margins 17, the capacitance forming unit 18, and the covers 19 according to this embodiment may further contain one or more types of metal elements such as magnesium (Mg), manganese (Mn), aluminum (Al), calcium (Ca), vanadium (V), chromium (Cr), zirconium (Zr), molybdenum (Mo), tungsten (W), tantalum (Ta), niobium (Nb), silicon (Si), boron (B), yttrium (Y), europium (Eu), gadolinium (Gd), dysprosium (Dy), holmium (Ho), erbium (Er), ytterbium (Yb), lithium (Li), potassium (K), and sodium (Na).

With the configuration described above, when a voltage is applied between the first external electrode 14 and the second external electrode 15 in the multi-layer ceramic capacitor 10, the voltage is applied to the ceramic layers between the first internal electrodes 12 and the second internal electrodes 13. With this configuration, the multi-layer ceramic capacitor 10 stores charge corresponding to the voltage applied between the first external electrode 14 and the second external electrode 15.

It should be noted that the multi-layer ceramic capacitor 10 according to this embodiment only needs to include the multi-layer unit 16 and the side margins 17, and other configurations can be changed as appropriate. For example, the number of first internal electrodes 12 and second internal electrodes 13 can be determined as appropriate according to the size and performance expected for the multi-layer ceramic capacitor 10.

Further, in FIGS. 2 and 3, in order to make the facing state of the first and second internal electrodes 12 and 13 easily viewable, the number of first internal electrodes 12 and the number of second internal electrodes 13 are each set to four. However, actually, more first and second internal electrodes 12 and 13 are provided so as to ensure the capacitance of the multi-layer ceramic capacitor 10.

FIG. 4 is an enlarged schematic view of an area Q shown in FIG. 3. Hereinafter, the first area 17a and the second area 17b will be described with reference to FIG. 4.

As shown in FIG. 4, the first area 17a and the second area 17b include the pores P. Here, in this embodiment, the porosities of the first area 17a and the second area 17b are adjusted such that the porosity of the first area 17a is 10% or less and the porosity of the second area 17b is higher than that of the first area 17a and is also 10% or more and 25% or less.

In this embodiment, the porosity of the first area 17a is 10% or less, and thus the first area 17a has high compactness. This allows the first area 17a to function as a barrier layer of the multi-layer unit 16 and suppresses infiltration of moisture or the like into the multi-layer unit 16 from the outside. Therefore, moisture resistance of the multi-layer ceramic capacitor 10 is ensured.

Further, because of the high compactness of the first areas 17a that cover the side surfaces S1 and S2 of the multi-layer unit 16, even when the first and second internal electrodes 12 and 13 are condensed and spheroidized by application of a high voltage to the multi-layer ceramic capacitor 10, the first areas 17a hardly cause breakdown. Therefore, voltage resistance of the multi-layer ceramic capacitor 10 is also ensured.

Furthermore, a dimension D2 of the first area 17a in the Y-axis direction is ¼ of the dimension D1 of the side margin 17 in the Y-axis direction, and a dimension D3 of the second area 17b in the Y-axis direction is ¾ of the dimension D1 of the side margin 17 in the Y-axis direction.

In other words, as shown in FIG. 4, in the side margin 17, the second area 17b including more pores P than in the first area 17a is formed to be larger than the first area 17a. Therefore, in the multi-layer ceramic capacitor 10, even when the side margin 17 includes the first area 17a having high compactness, the second area 17b provides flexibility, and thus resistance to physical impact is ensured.

This prevents a structural disorder such as cracks from being generated due to mechanical distortion (electrostrictive effect) caused when the voltage is applied to the multi-layer ceramic capacitor 10.

In FIG. 4, for the purpose of description, the first area 17a and the second area 17b are divided by a chain line, and the dimension D2 of the first area 17a in the Y-axis direction and the dimension D3 of the second area 17b in the Y-axis direction are uniform in the Z-axis direction. In this embodiment, however, the dimension D2 of the first area 17a in the Y-axis direction and the dimension D3 of the second area 17b in the Y-axis direction may not be uniform as shown in FIG. 4.

It should be noted that the porosity of the first area 17a of this embodiment is calculated by the following procedure, for example. First, a cross section of the first area 17a is imaged with a scanning electron microscope (SEM) at a predetermined magnification. Subsequently, from a plurality of pores P appearing in the image of the cross section of the first area 17a, some pores P are selected, and cross-sectional areas of the respective pores P are measured to calculate an average value thereof. A ratio of the average value to the imaged cross-sectional area of the first area 17a is then calculated. The porosity of the second area 17b can also be calculated by a procedure similar to that described above.

2. METHOD OF PRODUCING MULTI-LAYER CERAMIC CAPACITOR 10

Figure 5:
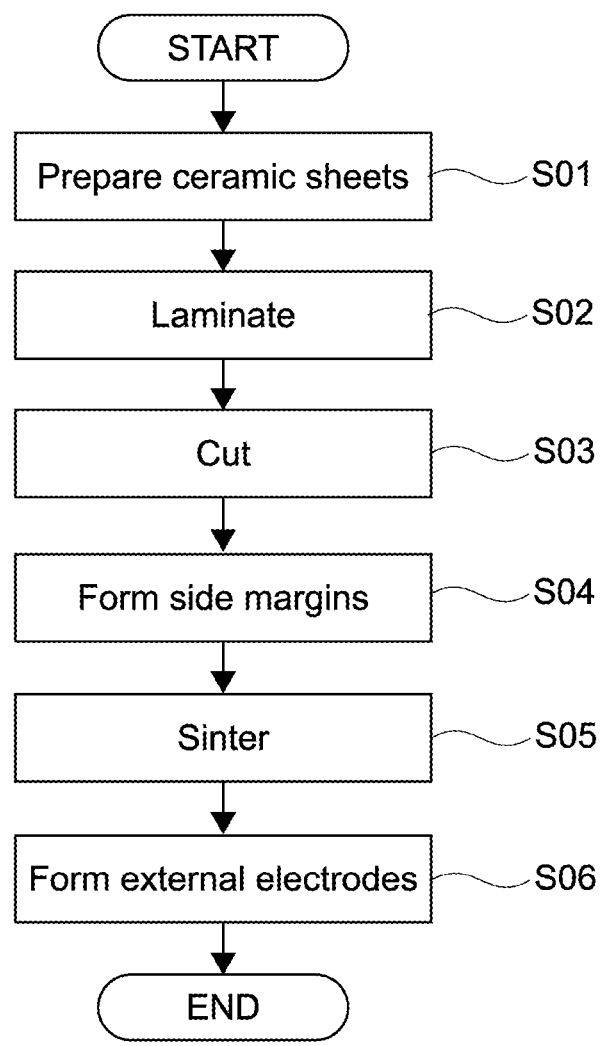
FIG. 5 is a flowchart showing a method of producing the multi-layer ceramic capacitor.
Figure 6:
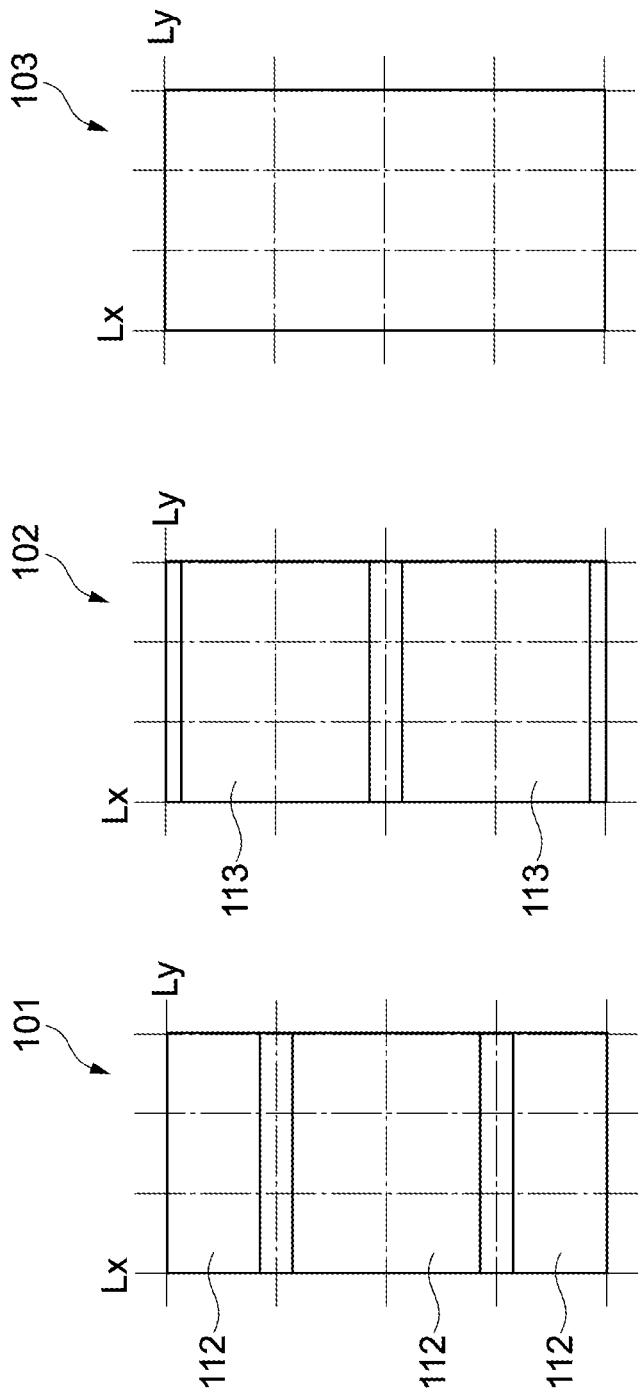
FIG. 6A is a plan view showing a production process of the multi-layer ceramic capacitor.
FIG. 6B is a plan view showing a production process of the multi-layer ceramic capacitor.
FIG. 6C is a plan view showing a production process of the multi-layer ceramic capacitor.

FIG. 5 is a flowchart showing a method of producing the multi-layer ceramic capacitor 10. FIGS. 6A to 17 are views each showing a production process of the multi-layer ceramic capacitor 10. Hereinafter, the method of producing the multi-layer ceramic capacitor 10 will be described along FIG. 5 with reference to FIGS. 6A to 17 as appropriate.

2.1 Step S01: Preparation of Ceramic Sheets

In Step S01, first ceramic sheets 101 and second ceramic sheets 102 for forming the capacitance forming unit 18, and third ceramic sheets 103 for forming the covers 19 are prepared. The first, second, and third ceramic sheets 101, 102, and 103 mainly contain insulating ceramics and are formed as unsintered dielectric green sheets. The first, second, and third ceramic sheets 101, 102, and 103 are formed into sheets by using a roll coater or a doctor blade, for example.

FIGS. 6A, 6B, and 6C are plan views of the first, second, and third ceramic sheets 101, 102, and 103, respectively. At this stage, the first, second, and third ceramic sheets 101, 102, and 103 are not yet cut into the multi-layer ceramic capacitors 10. FIGS. 6A, 6B, and 6C each show cutting lines Lx and Ly used when the sheets are cut into the multi-layer ceramic capacitors 10. The cutting lines Lx are parallel to the X axis, and the cutting lines Ly are parallel to the Y axis.

As shown in FIGS. 6A, 6B, and 6C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheet 103 corresponding to the cover 19.

The first and second internal electrodes 112 and 113 can be formed using an electrical conductive paste containing nickel (Ni), for example. For formation of the first and second internal electrodes 112 and 113 by use of an electrical conductive paste, a screen printing method or a gravure printing method can be used, for example.

Each of the first and second internal electrodes 112 and 113 is disposed over two areas and extends like a belt in the Y-axis direction. The two areas are adjacent to each other in the X-axis direction and divided by the cutting line Ly. The first internal electrodes 112 are shifted from the second internal electrodes 113 in the X-axis direction by one row including the areas divided by the cutting lines Ly. In other words, the cutting line Ly passing through the center of the first internal electrode 112 passes through an area between the second internal electrodes 113, and the cutting line Ly passing through the center of the second internal electrode 113 passes through an area between the first internal electrodes 112.

2.2 Step S02: Lamination

In Step S02, the first, second, and third ceramic sheets 101, 102, and 103 prepared in Step S01 are laminated, to produce a multi-layer sheet 104.

Figure 7:
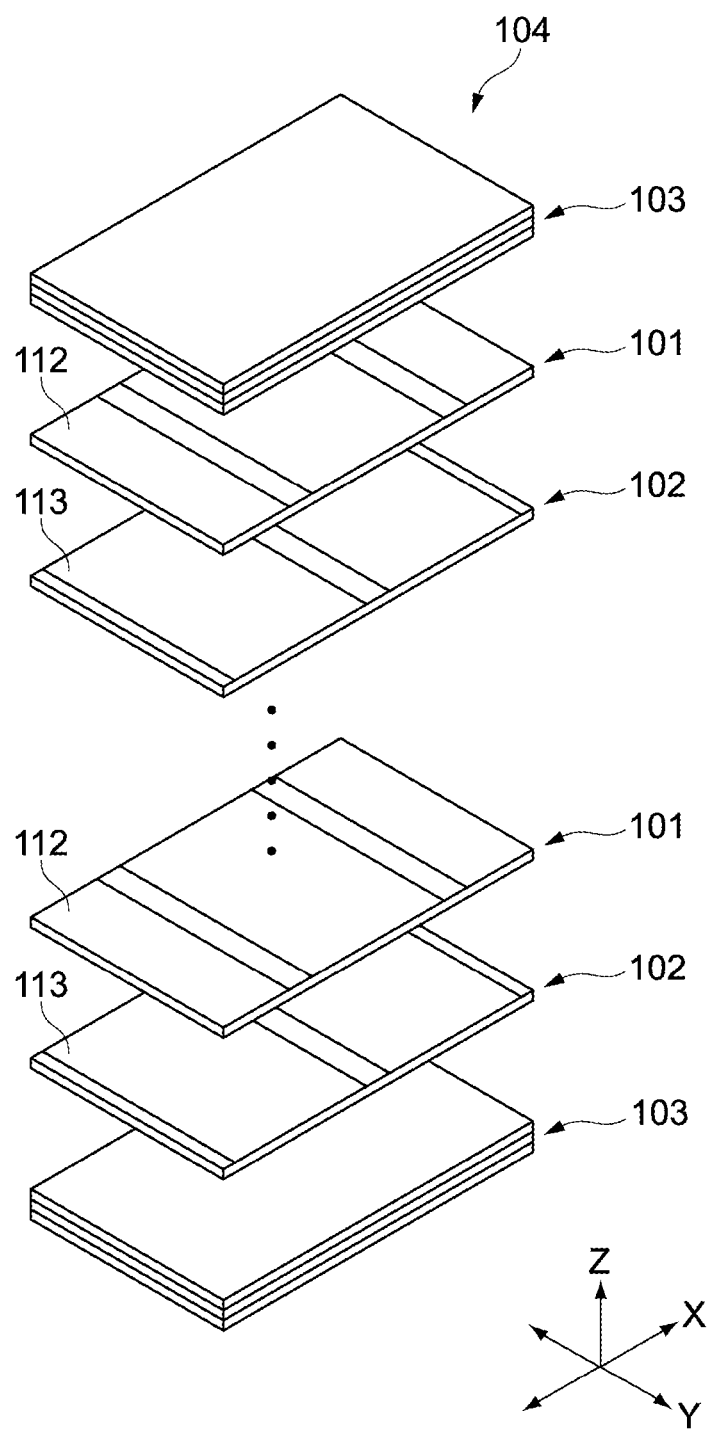
FIG. 7 is an exploded perspective view showing the production process of the multi-layer ceramic capacitor.

FIG. 7 is an exploded perspective view of the multi-layer sheet 104 obtained in Step S02. For the purpose of description, FIG. 7 shows the first, second, and third ceramic sheets 101, 102, and 103 in an exploded manner. In an actual multi-layer sheet 104, however, the first, second, and third ceramic sheets 101, 102, and 103 are pressure-bonded by hydrostatic pressing, uniaxial pressing, or the like for integration. With this configuration, a high-density multi-layer sheet 104 is obtained.

In the multi-layer sheet 104, the first ceramic sheets 101 and the second ceramic sheets 102 that correspond to the capacitance forming unit 18 are alternately laminated in the Z-axis direction.

Further, in the multi-layer sheet 104, the third ceramic sheets 103 corresponding to the covers 19 are laminated on the uppermost and lowermost surfaces of the first and second ceramic sheets 101 and 102 alternately laminated in the Z-axis direction. It should be noted that in the example shown in FIG. 7, three third ceramic sheets 103 are laminated on each of the uppermost and lowermost surfaces of the laminated first and second ceramic sheets 101 and 102, but the number of third ceramic sheets 103 can be changed as appropriate.

2.3 Step S03: Cutting

In Step S03, the multi-layer sheet 104 obtained in Step S02 is cut with a rotary blade, a push-cutting blade, or the like, to produce unsintered multi-layer chips 116.

Figure 8:
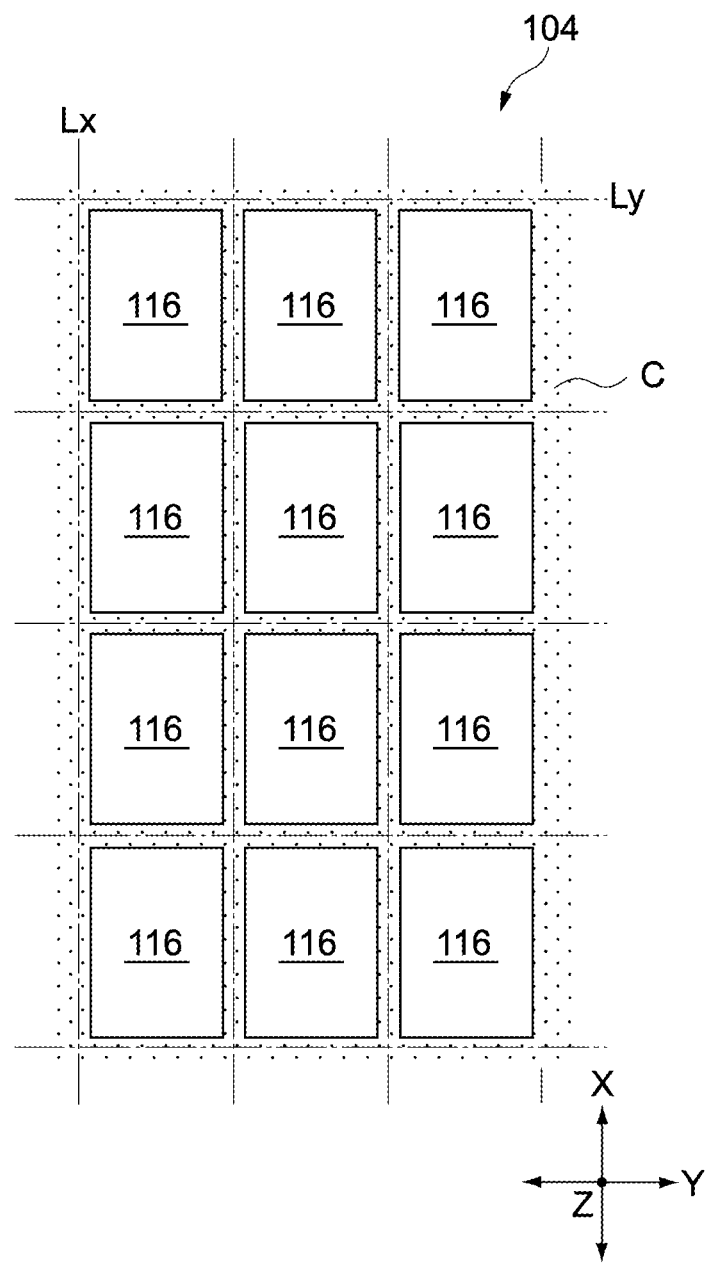
FIG. 8 is a plan view showing the production process of the multi-layer ceramic capacitor.

FIG. 8 is a plan view of the multi-layer sheet 104 after Step S03. The multi-layer sheet 104 is cut along the cutting lines Lx and Ly while being fixed to a holding member C. As a result, the multi-layer sheet 104 is singulated, so that the multi-layer chips 116 are obtained. At that time, the holding member C is not cut, and thus the multi-layer chips 116 are connected via the holding member C.

Figure 9:
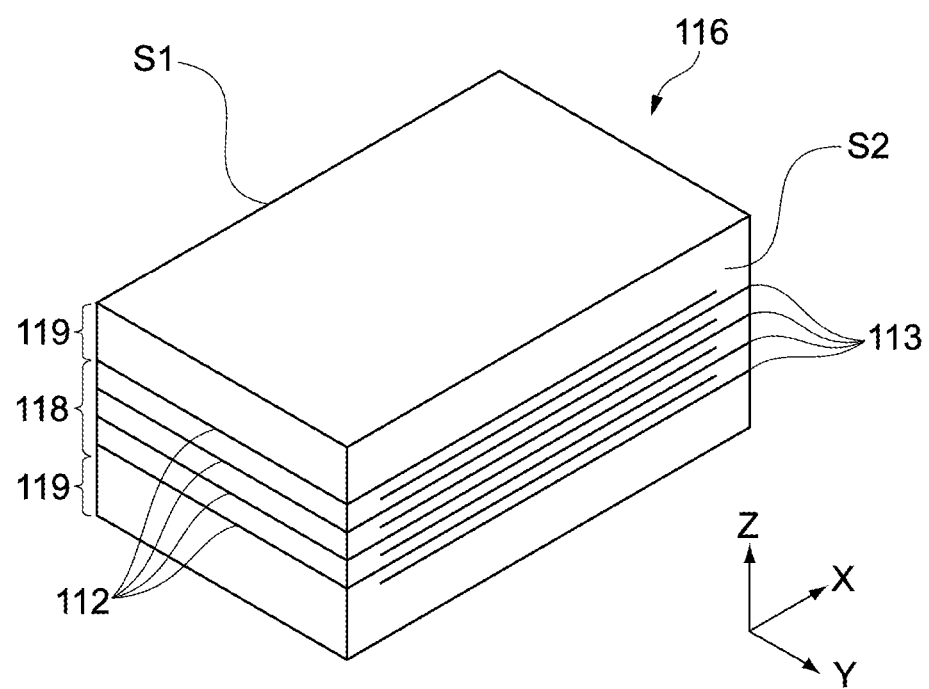
FIG. 9 is a perspective view showing the production process of the multi-layer ceramic capacitor.

FIG. 9 is a perspective view of the multi-layer chip 116 obtained in Step S03. The multi-layer chip 116 includes a capacitance forming unit 118 and covers 119 that are unsintered. In the multi-layer chip 116, the unsintered first and second internal electrodes 112 and 113 are exposed to the cut surfaces, i.e., both the side surfaces S1 and S2 oriented in the Y-axis direction.

2.4 Step S04: Formation of Side Margins

In Step S04, unsintered side margins 117 are provided to the side surfaces S1 and S2 of the multi-layer chip 116, to produce an unsintered body 111.

In Step S04, in order to provide the side margins 117 to both the side surfaces S1 and S2 of the multi-layer chip 116, the orientation of the multi-layer chip 116 is changed as appropriate by replacement of a holding member such as a tape, for example.

In particular, in Step S04, the side margins 117 are provided to both the side surfaces S1 and S2 that are oriented in the Y-axis direction, both the side surfaces S1 and S2 being the cut surfaces of the multi-layer chip 116 in Step S03. For that reason, in Step S04, it is desirable to previously detach the multi-layer chips 116 from the holding member C and rotate the multi-layer chips 116 by 90 degrees.

Next, the side margins 117 are attached to the side surfaces S1 and S2 of the multi-layer chip 116, to produce the unsintered body 111.

Figure 10:
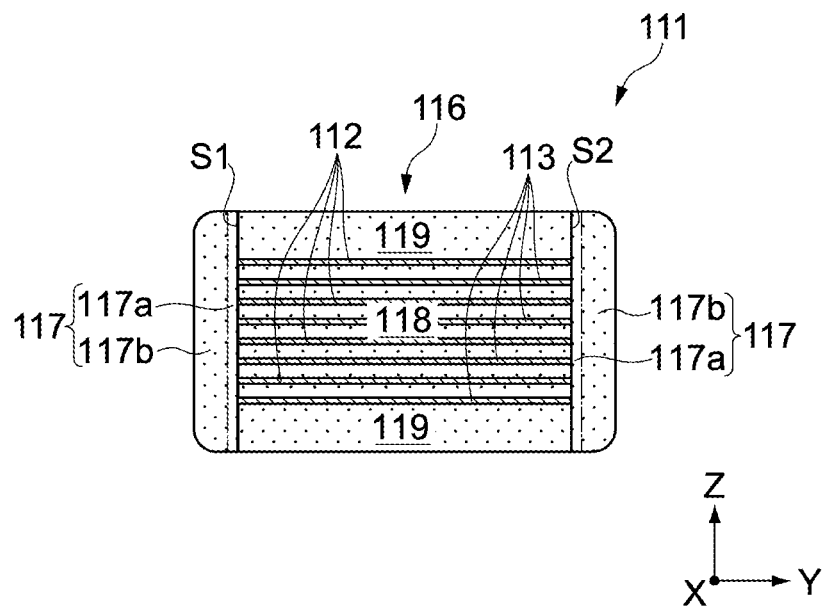
FIG. 10 is a cross-sectional view showing the production process of the multi-layer ceramic capacitor.

FIG. 10 is a cross-sectional view of the unsintered body 111 obtained in Step S04. The unsintered body 111 has a configuration in which the ends of the unsintered first and second internal electrodes 112 and 113 exposed to the side surfaces S1 and S2 are covered with the side margins 117, and the ends of the unsintered first and second internal electrodes 112 and 113 in the X-axis direction are exposed to the end surfaces of the unsintered body 111 in the X-axis direction.

Further, in the body 111, the side margins 117, which are attached to the side surfaces S1 and S2 of the multi-layer chip 116, are each divided into a first area 117a and a second area 117b as shown in FIG. 10.

Here, the first area 117a is an area where insulating ceramic particles aggregate in a high density, and the second area 117b is an area having a lower density of insulating ceramic particles than that of the first area 117a.

Figure 15:
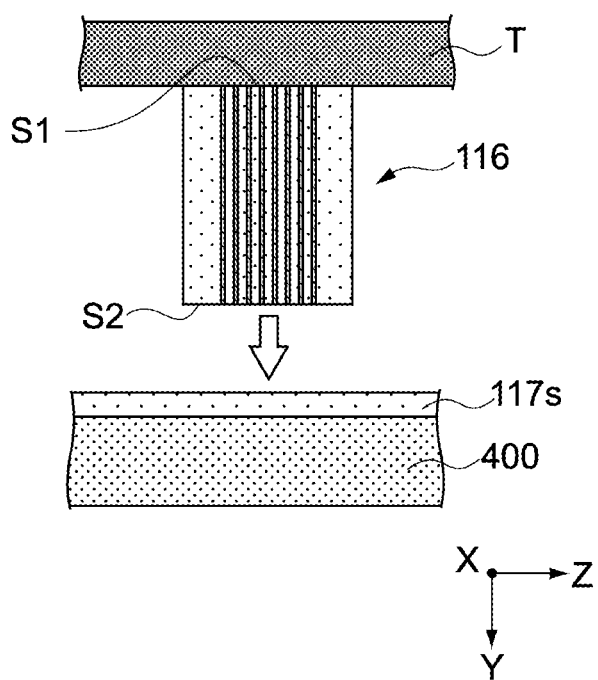
FIG. 15 is a schematic view showing the production process of the multi-layer ceramic capacitor.
Figure 16:
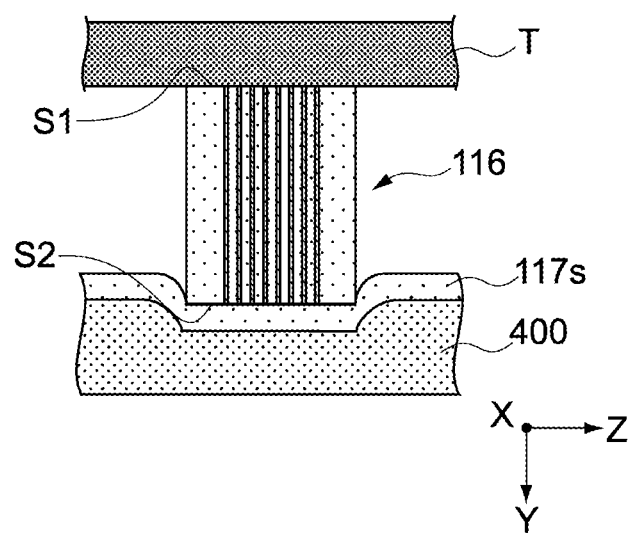
FIG. 16 is a schematic view showing the production process of the multi-layer ceramic capacitor.
Figure 17:
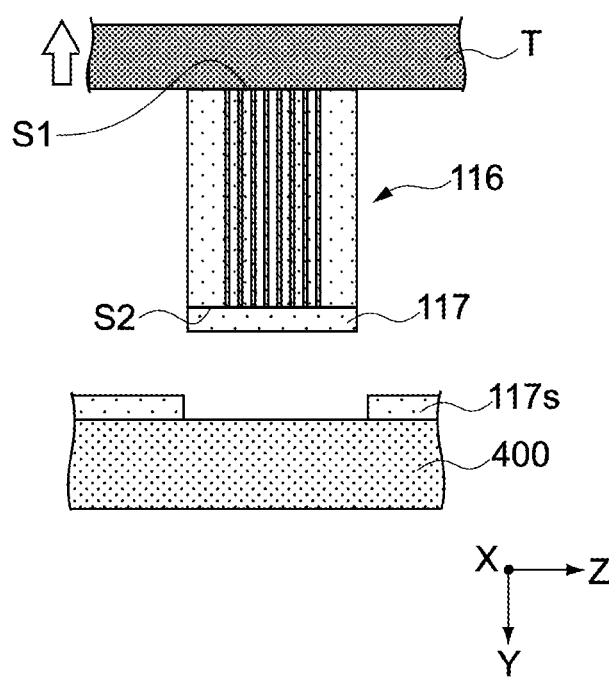
FIG. 17 is a schematic view showing the production process of the multi-layer ceramic capacitor.

The side margins 117 as described above can be produced by, for example, the following procedure. FIGS. 11 to 14 are schematic views each showing the production process of a ceramic sheet 117s according to this embodiment. Further, FIGS. 15 to 17 are views each showing a state where the ceramic sheet 117s is punched out by the multi-layer chip 116. Hereinafter, the process of forming the side margins 117 on the side surfaces S1 and S2 of the multi-layer chip 116 will be described step by step.

Figure 11:
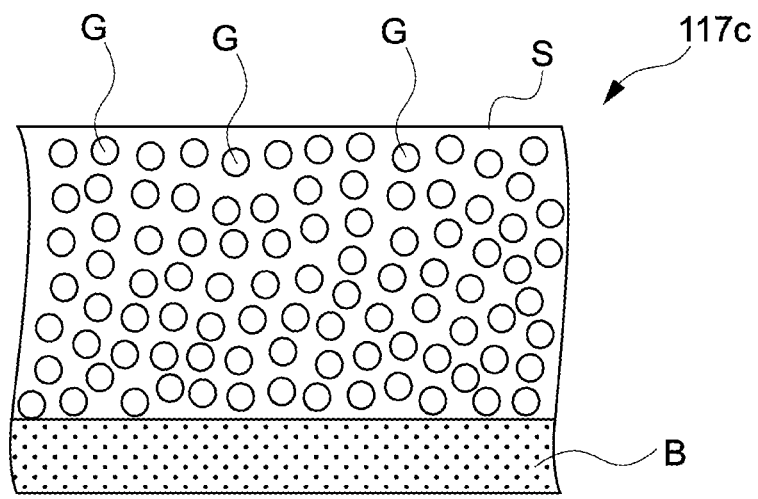
FIG. 11 is a schematic view showing an example of the production process of the multi-layer ceramic capacitor.

First, as shown in FIG. 11, ceramic slurry mainly containing insulating ceramics and also containing a binder, a first solvent, a second solvent having a higher boiling point than that of the first solvent, and the like is applied to a base material B. Thus, a film 117c is formed as an unsintered dielectric green sheet on the base material B.

For the first solvent, a solvent having an adequate boiling point can be selected as appropriate. For example, the first solvent is a mixed solvent containing one or more solvents optionally selected from ethanol, 1-propanol, 2-propanol, toluene, acetone, methyl ethyl ketone, and the like.

The second solvent is provided at, for example, approximately 5% of the total amount of the first and second solvents. Further, the second solvent is not particularly limited as long as the boiling point thereof is higher than that of the first solvent. The second solvent can be, for example, 1-butanol, 2-butanol, ethylene glycol, or propylene glycol. Further, the type of the base material B is also not particularly limited, and the base material B may be, for example, a polyethylene terephthalate (PET) film.

The film 117c is formed into a sheet by using, for example, a roll coater or a doctor blade. At the stage where the film 117c is formed on the base material B, as shown in FIG. 11, insulating ceramic particles G are dispersed in the film 117c.

Figure 12:
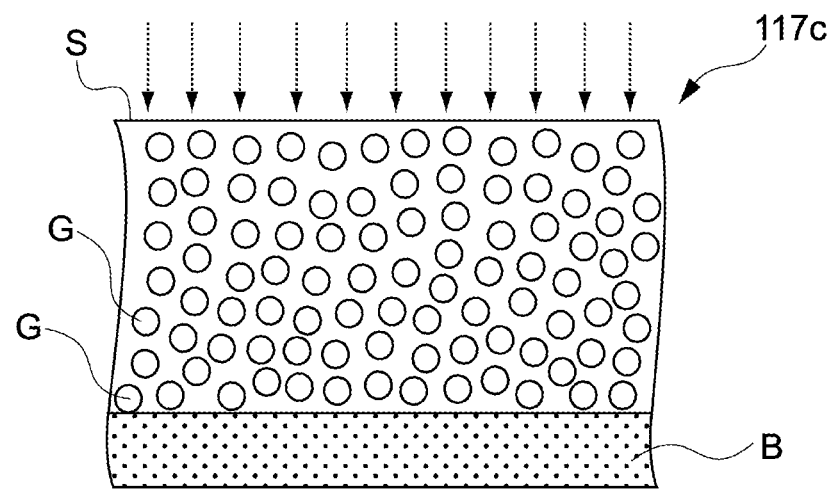
FIG. 12 is a schematic view showing an example of the production process of the multi-layer ceramic capacitor.
Figure 13:
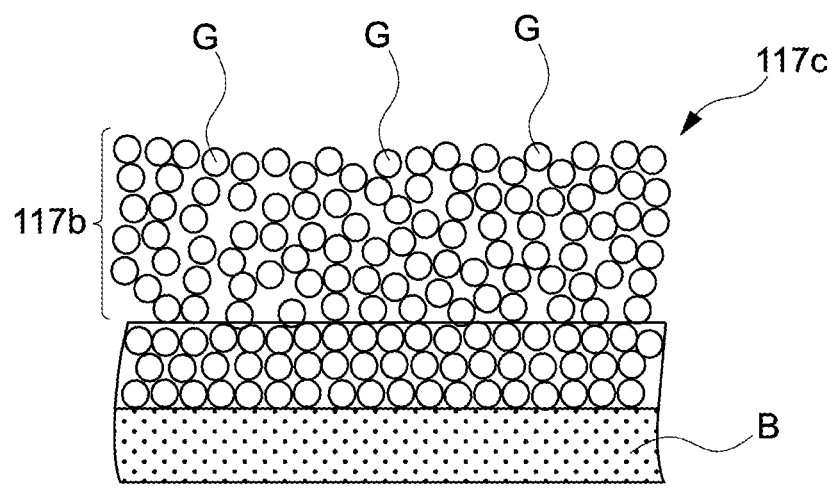
FIG. 13 is a schematic view showing an example of the production process of the multi-layer ceramic capacitor.

Next, as shown in FIG. 12, hot air is sprayed onto the film 117c formed on the base material B from the surface S side, the surface S being one surface of the film 117c. This causes the first solvent to rapidly evaporate before the insulating ceramic particles G aggregate, and as shown in FIG. 13, the second area 117b having a low aggregate density of the insulating ceramic particles G is formed on the film 117c.

Meanwhile, since the second solvent has a higher boiling point than that of the first solvent, the second solvent hardly evaporates while the first solvent is evaporating, and remains on the base material B side of the film 117c. This causes the insulating ceramic particles G in the second solvent to aggregate on the base material B side of the film 117c while the first solvent is evaporating. Therefore, in a ceramic sheet 117s obtained by drying the film 117c, as shown in FIG. 14, the first area 117a having high compactness is formed on the base material B side.

Figure 14:
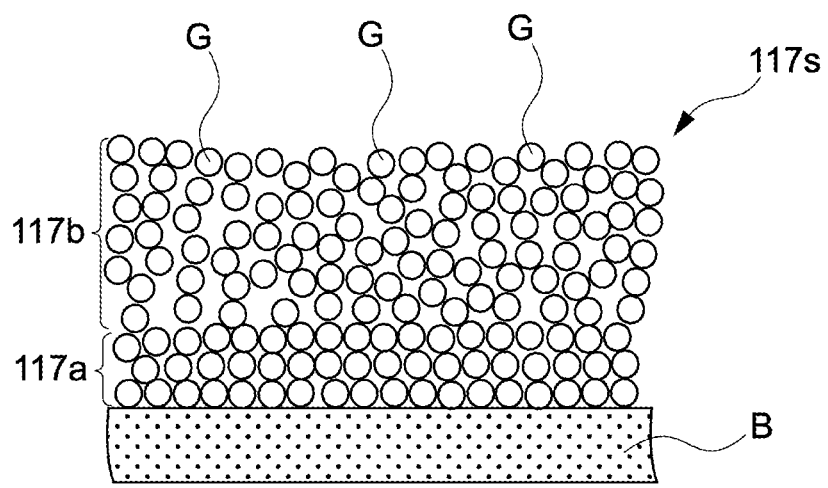
FIG. 14 is a schematic view showing an example of the production process of the multi-layer ceramic capacitor.

In other words, in Step S04, the film 117c is dried from one surface (surface S), so that the first area 117a in which the insulating ceramic particles G aggregate in a high density on the base material B side, and the second area 117b in which the density of the insulating ceramic particles G is lower than that of the first area 117a are formed in the ceramic sheet 117s as shown in FIG. 14.

Next, as shown in FIG. 15, the ceramic sheet 117s produced by the procedure described above is disposed on a flat plate-like elastic body 400. The multi-layer chip 116 is then disposed such that the side surface S2 of the multi-layer chip 116 faces the ceramic sheet 117s in the Y-axis direction.

In this case, the ceramic sheet 117s is disposed on the elastic body 400 such that the first area 117a of the ceramic sheet 117s faces the side surface S2 and the second area 117b of the ceramic sheet 117s faces the elastic body 400.

In Step S04, the orientation of the multi-layer chip 116 is changed as appropriate by the step of replacing the holding member such as a tape, and thus the side surface S1 of the multi-layer chip 116 is held by a tape T, as shown in FIG. 15.

Subsequently, the multi-layer chip 116 is moved toward the ceramic sheet 117s in the Y-axis direction, and the side surface S2 of the multi-layer chip 116 is thus pressed against the ceramic sheet 117s.

In this case, as shown in FIG. 16, the multi-layer chip 116 bites into the elastic body 400 together with the ceramic sheet 117s. Accordingly, the elastic body 400 is raised in the Y-axis direction and pushes up the ceramic sheet 117s by a pressing force in the Y-axis direction that is applied from the multi-layer chip 116 to the elastic body 400.

This causes a shear force applied from the elastic body 400 to the ceramic sheet 117s, and the ceramic sheet 117s facing the side surface S2 in the Y-axis direction is cut off. This ceramic sheet 117s is then attached to the side surface S2.

Next, when the multi-layer chip 116 is moved in the Y-axis direction so as to be separated from the elastic body 400, as shown in FIG. 17, only the ceramic sheet 117s attached to the side surface S2 is separated from the elastic body 400. Thus, the side margin 117 is formed on the side surface S2 of the multi-layer chip 116.

Subsequently, the multi-layer chip 116 held by the tape T is held by another tape. Thus, the side surface S1 of the multi-layer chip 116 is exposed to face the ceramic sheet 117s in the Y-axis direction. Through a step similar to the above-mentioned step of forming the side margin 117 on the side surface S2, the side margin 117 is formed also on the side surface S1.

This provides an unsintered body 111 including the side margins 117 formed on both the side surfaces S1 and S2 of the multi-layer chip 116.

2.5 Step S05: Sintering

In Step S05, the unsintered body 111 obtained in Step S04 is sintered to produce the body 11 of the multi-layer ceramic capacitor 10 shown in FIGS. 1 to 3. In other words, in Step S05, the first internal electrodes 112 and the second internal electrodes 113 respectively become the first internal electrodes 12 and the second internal electrodes 13, the multi-layer chip 116 becomes the multi-layer unit 16, and the side margins 117 become the side margins 17. Further, the first area 117a becomes the first area 17a, and the second area 117b becomes the second area 17b.

A sintering temperature for the body 111 in Step S05 can be determined on the basis of a sintering temperature for the multi-layer chip 116 and the side margins 117. For example, when a barium titanate ($BaTiO_3$) based material is used as ceramics, the sintering temperature for the body 111 can be set to approximately 1,000 to 1,300° C. Further, sintering can be performed in a reduction atmosphere or a low-oxygen partial pressure atmosphere, for example.

In this embodiment, in the former Step S04, the first area 117a in which the insulating ceramic particles G aggregate in a high density, and the second area 117b in which the density of the insulating ceramic particles G is lower than that of the first area 117a are formed in the side margin 117. Here, as shown in FIG. 10, the second area 117b is formed to be larger than the first area 117a in each of the side margins 117 in the body 111.

With this configuration, in the unsintered body 111, the flexibility of the side margin 117 is ensured by the second area 117b. Therefore, at the time of sintering of the unsintered body 111, stress caused by a difference in shrinkage behavior between the multi-layer chip 116 and the side margins 117 is relieved. Thus, a structural disorder such as cracks is prevented.

2.6 Step S06: Formation of External Electrodes

In Step S06, the first external electrode 14 and the second external electrode 15 are formed on the body 11 obtained in Step S05, to produce the multi-layer ceramic capacitor 10 shown in FIGS. 1 to 3.

In Step S06, first, an unsintered electrode material is applied so as to cover one of the end surfaces of the body 11 and then applied so as to cover the other one of the end surfaces of the body 11, the end surfaces being oriented in the X-axis direction. The applied unsintered electrode materials are subjected to baking in a reduction atmosphere or a low-oxygen partial pressure atmosphere, for example, to form base films on the body 11. On the base films baked onto the body 11, intermediate films and surface films are formed by plating such as electrolytic plating. Thus, the first external electrode 14 and the second external electrode 15 are completed.

It should be noted that part of the processing in Step S06 described above may be performed before Step S05. For example, before Step S05, the unsintered electrode material may be applied to both the end surfaces of the unsintered body 111 that are oriented in the X-axis direction, and in Step S05, the unsintered body 111 may be sintered and, simultaneously, the unsintered electrode material may be baked to form base films of the first external electrode 14 and the second external electrode 15.

2.7 Modified Example

The method of producing the multi-layer ceramic capacitor 10 is not limited to the production method described above, and the production steps may be changed or added as appropriate.

A method of forming the side margins 117 on the side surfaces S1 and S2 of the multi-layer chip 116 is not limited to the method described above.

For example, by a dip method of immersing both the side surfaces S1 and S2 of the multi-layer chip 116 into ceramic slurry and pulling the side surfaces S1 and S2 out of the ceramic slurry, films of the ceramic slurry may be formed on both the side surfaces S1 and S2 of the multi-layer chip 116, to form the side margins 117.

In this case, the side margins 117 each including the first area 117a and the second area 117b may be formed by drying the films of the ceramic slurry from the surfaces thereof.

3. EXAMPLES

Hereinafter, Examples of the present invention will be described.

3.1 Production of Multi-Layer Ceramic Capacitor 100 samples of the multi-layer ceramic capacitors according to each of Examples 1 to 3 and Comparative Examples 1 to 7 were produced by the production method described above. The samples according to Examples 1 to 3 and Comparative Examples 1 to 7 were produced under common production conditions except for the thickness of the side margin, and the dimensions and porosities of the first and second areas.

Example 1

In the samples according to Example 1, the dimension D1 of the side margin 117 is 19.3 µm. Further, the dimension D2 of the first area 117a is 4.8 µm, and the dimension D3 of the second area 117b is 14.5 µm. Furthermore, the porosity of the first area 117a is 0.9%, and the porosity of the second area 117b is 11.7%.

Example 2

In the samples according to Example 2, the dimension D1 of the side margin 117 is 22.0 µm. Further, the dimension D2 of the first area 117a is 5.5 µm, and the dimension D3 of the second area 117b is 16.5 µm. Furthermore, the porosity of the first area 117a is 5.3%, and the porosity of the second area 117b is 16.2%.

Example 3

In the samples according to Example 3, the dimension D1 of the side margin 117 is 22.5 µm. Further, the dimension D2 of the first area 117a is 5.6 µm, and the dimension D3 of the second area 117b is 16.9 µm. Furthermore, the porosity of the first area 117a is 7.3%, and the porosity of the second area 117b is 23.1%.

Comparative Example 1

In the samples according to Comparative Example 1, the dimension of the side margin is 19.1 µm. Further, the dimension of the first area is 4.8 µm, and the dimension of the second area is 14.3 µm. Furthermore, the porosity of the first area is 0.9%, and the porosity of the second area is 0.8%.

Comparative Example 2

In the samples according to Comparative Example 2, the dimension of the side margin is 20.1 µm. Further, the dimension of the first area is 5.0 and the dimension of the second area is 15.1 µm. Furthermore, the porosity of the first area is 4.9%, and the porosity of the second area is 5.1%.

Comparative Example 3

In the samples according to Comparative Example 3, the dimension of the side margin is 21.1 µm. Further, the dimension of the first area is 5.3 and the dimension of the second area is 15.8 µm. Furthermore, the porosity of the first area is 9.6%, and the porosity of the second area is 5.6%.

Comparative Example 4

In the samples according to Comparative Example 4, the dimension of the side margin is 22.0 µm. Further, the dimension of the first area is 5.5 and the dimension of the second area is 16.5 µm. Furthermore, the porosity of the first area is 11.0%, and the porosity of the second area is 8.0%.

Comparative Example 5

In the samples according to Comparative Example 5, the dimension of the side margin is 23.1 µm. Further, the dimension of the first area is 5.8 µm, and the dimension of the second area is 17.3 µm. Furthermore, the porosity of the first area is 13.3%, and the porosity of the second area is 12.1%.

Comparative Example 6

In the samples according to Comparative Example 6, the dimension of the side margin is 23.9 µm. Further, the dimension of the first area is 6.0 µm, and the dimension of the second area is 17.9 µm. Furthermore, the porosity of the first area is 13.2%, and the porosity of the second area is 28.5%.

Comparative Example 7

In the samples according to Comparative Example 7, the dimension of the side margin is 24.0 µm. Further, the dimension of the first area is 6.0 and the dimension of the second area is 18.0 μm. Furthermore, the porosity of the first area is 9.5%, and the porosity of the second area is 28.9%.

3.2 Evaluation of Multi-Layer Ceramic Capacitor

Evaluation of Cracks

For the samples of the multi-layer ceramic capacitors according to each of Examples 1 to 3 and Comparative Examples 1 to 7, the number of samples with cracks in the 100 samples was investigated. Whether a sample has cracks or not was determined through observation of a cross section of the sample with use of an optical microscope.

Evaluation of Voltage Resistance

Voltage resistance was evaluated for the samples of the multi-layer ceramic capacitors according to each of Examples 1 to 3 and Comparative Examples 1 to 7.

Specifically, for the samples of the multi-layer ceramic capacitors according to each of Examples 1 to 3 and Comparative Examples 1 to 7, a failure voltage at a time when a voltage is increased by 1 V per second in the range of 1 to 200 V was measured at a temperature of 25° C. In this case, samples whose failure voltage exceeds 40 V were determined as evaluation A in which the voltage resistance is ensured, and samples whose failure voltage is 40 V or less were determined as evaluation B in which the voltage resistance is poor.

It should be noted that in the evaluation of the voltage resistance, among the samples in which cracks are not generated at the time of sintering, half of them was used. Subsequently, moisture resistance, which will be described below, was evaluated for the remaining half of the samples.

Evaluation of Moisture Resistance

Moisture resistance was evaluated for the samples of the multi-layer ceramic capacitors according to each of Examples 1 to 3 and Comparative Examples 1 to 7.

Specifically, a hygroscopicity test was performed, in which the samples of the multi-layer ceramic capacitors according to each of Examples 1 to 3 and Comparative Examples 1 to 7 are held at a temperature of 45° C. and a humidity of 95% under application of a rated voltage of 10 V. For each of the samples having been subjected to the hygroscopicity test, an electric resistance value was measured. Samples whose electric resistance value is 10 MΩ or more were determined as evaluation A in which the moisture resistance is ensured, and samples whose electric resistance value is less than 10 MΩ were determined as evaluation B in which the moisture resistance is poor.

It should be noted that in the evaluation of the moisture resistance, among the samples in which cracks are not generated at the time of sintering, the half of them was used as described above.

3.3 Results of Evaluation

Table 1 shows evaluation results of the multi-layer ceramic capacitors.

TABLE 1

| Sample | Thickness of side margin | Dimension of first area | Dimension of second area | Porosity of first area | Porosity of second area | Number of cracks generated in sintering | Failure voltage in voltage resistance test | Evaluation in voltage resistance test | Evaluation in moisture resistance test |
|---|---|---|---|---|---|---|---|---|---|
| Example 1 | 19.3 μm | 4.8 μm | 14.5 μm | 0.9% | 11.7% | 0/100 | 69 V | A | A |
| Example 2 | 22.0 μm | 5.5 μm | 16.5 μm | 5.3% | 16.2% | 0/100 | 51 V | A | A |
| Example 3 | 22.5 μm | 5.6 μm | 16.9 μm | 7.3% | 23.1% | 0/100 | 47 V | A | A |
| Comparative Example 1 | 19.1 μm | 4.8 μm | 14.3 μm | 0.9% | 0.8% | 12/100 | 29 V | B | A |
| Comparative Example 2 | 20.1 μm | 5.0 μm | 15.1 μm | 4.9% | 5.1% | 3/100 | 27 V | B | A |
| Comparative Example 3 | 21.1 μm | 5.3 μm | 15.8 μm | 9.6% | 5.6% | 4/100 | 33 V | B | A |
| Comparative Example 4 | 22.0 μm | 5.5 μm | 16.5 μm | 11.0% | 8.0% | 2/100 | 29 V | B | B |
| Comparative Example 5 | 23.1 μm | 5.8 μm | 17.3 μm | 13.3% | 12.1% | 0/100 | 31 V | B | B |
| Comparative Example 6 | 23.9 μm | 6.0 μm | 17.9 μm | 13.2% | 28.5% | 0/100 | 25 V | B | B |
| Comparative Example 7 | 24.0 μm | 6.0 μm | 18.0 μm | 9.5% | 28.9% | 0/100 | 45 V | A | B |

Referring to Table 1, in all the samples of the multi-layer ceramic capacitors 10 according to Examples 1 to 3, samples with cracks were not observed. Further, it was observed that both of the voltage resistance and the moisture resistance are ensured.

In the samples of the multi-layer ceramic capacitors 10 according to Examples 1 to 3, the porosity of the first area 17a is 10% or less, and the porosity of the second area 17b is 10% or more and 25% or less.

Meanwhile, in the samples of the multi-layer ceramic capacitors according to Comparative Examples 1 to 4, samples with cracks were observed. Further, in the samples of the multi-layer ceramic capacitors according to Comparative Examples 1 to 3, it was observed that the moisture resistance is ensured, but the voltage resistance is poor. In the samples of the multi-layer ceramic capacitors according to Comparative Example 4, it was observed that both of the moisture resistance and the voltage resistance are poor.

In the samples of the multi-layer ceramic capacitors according to Comparative Examples 1 to 4, a cause of cracks of the samples may be because the porosity of the second area is lower than 10%, and the flexibility of the side margin thus becomes insufficient. Thus, the cracks may be generated at the time of sintering.

Further, in the samples of the multi-layer ceramic capacitors according to Comparative Examples 1 to 4, a cause of the poor voltage resistance may be because, as in the above case, the porosity of the second area is lower than 10%, and the flexibility of the side margin thus becomes insufficient, thus leading to generation of cracks due to the electrostrictive effect in the multi-layer ceramic capacitors.

Furthermore, in the samples of the multi-layer ceramic capacitors according to Comparative Example 4, a cause of the poor voltage resistance may be because, in addition to the above reason, the porosity of the first area is higher than 10%, and spheroidizing in the internal electrodes that occurs when a high voltage is applied to the multi-layer ceramic capacitors is difficult to suppress, thus leading to occurrence of an insulation failure in the vicinity of the side margin.

Additionally, in the samples of the multi-layer ceramic capacitors according to Comparative Example 4, a cause of the poor moisture resistance may be because the porosity of the first area is higher than 10%, and the first area fails to sufficiently function as a barrier layer of the multi-layer unit, thus leading to occurrence of a failure in moisture resistance.

In the samples of the multi-layer ceramic capacitors according to Comparative Examples 5 and 6, samples with cracks were not observed, but it was observed that both of the moisture resistance and the voltage resistance are poor.

In the samples of the multi-layer ceramic capacitors according to Comparative Examples 5 and 6, a cause of the poor voltage resistance may be because the porosity of the first area is higher than 10%, and an insulation failure thus occurs in the vicinity of the side margin, as in the case of the samples according to Comparative Example 4.

Further, in the samples of the multi-layer ceramic capacitors according to Comparative Examples 5 and 6, a cause of the poor moisture resistance may be because the porosity of the first area is higher than 10%, and a failure in moisture resistance thus occurs due to the reason similar to that in the samples according to Comparative Example 4.

Furthermore, in the samples of the multi-layer ceramic capacitors according to Comparative Example 6, a cause of the poor moisture resistance may also be because, in addition to the above reason, the porosity of the second area is higher than 25%, and infiltration of moisture or the like into the multi-layer unit from the outside fails to be suppressed, thus leading occurrence of a failure in moisture resistance.

In the samples of the multi-layer ceramic capacitors according to Comparative Example 7, samples with cracks were not observed, but it was observed that the moisture resistance is poor.

In the samples of the multi-layer ceramic capacitors according to Comparative Example 7, a cause of the poor moisture resistance may be because the porosity of the second area is higher than 25%, and a failure in moisture resistance thus occurs due to the reason similar to that in the samples according to Comparative Example 6.

From those results, it was confirmed that when the porosity of the second area of the side margin is 10% or more in the multi-layer ceramic capacitor, it is possible to suppress the occurrence of cracks at the time of sintering.

Further, it was confirmed that when the porosity of the first area is 10% or less and the porosity of the second area is 10% or more in the side margin of the multi-layer ceramic capacitor, the voltage resistance is ensured.

Furthermore, it was confirmed that when the porosity of the first area is 10% or less and the porosity of the second area is 25% or less, the moisture resistance is also ensured.

In other words, it was experimentally confirmed that the multi-layer ceramic capacitor 10 according to the embodiment described above has a configuration in which, when the porosity of the first area 17a in the side margin 17 is 10% or less and the porosity of the second area 17b in the side margin 17 is 10% or more and 25% or less, the occurrence of cracks at the time of sintering is suppressed and the voltage resistance and the moisture resistance are ensured.

4. OTHER EMBODIMENTS

While the embodiment of the present invention has been described, the present invention is not limited to the embodiment described above, and it should be appreciated that the present invention may be variously modified.

For example, in the multi-layer ceramic capacitor 10, the capacitance forming unit 18 may be divided into capacitance forming units in the Z-axis direction. In this case, in each capacitance forming unit 18, the first internal electrodes 12 and the second internal electrodes 13 only need to be alternately disposed along the Z-axis direction. In a portion where the capacitance forming units 18 are next to each other, the first internal electrodes 12 or the second internal electrodes 13 may be continuously disposed.

What is claimed is:

1. A multi-layer ceramic capacitor, comprising:
   a multi-layer unit that includes
     ceramic layers laminated in a first direction,
     internal electrodes disposed between the ceramic layers, and
     a side surface from which the internal electrodes are exposed, the side surface being oriented in a second direction orthogonal to the first direction; and
   a side margin that covers the side surface, the side margin including
     a first area having a porosity of 10% or less, a dimension of the first area in the second direction from the side surface being ¼ of a dimension of the side margin in the second direction, and
     a second area having a porosity of 10% or more and 25% or less and having a porosity higher than the porosity of the first area, the second area covering the first area from the second direction.

2. The multi-layer ceramic capacitor according to claim 1, wherein
   a dimension of the side margin in the second direction is 25 μm or less.

* * * * *